United States Patent
Matsumura et al.

(10) Patent No.: US 11,750,354 B2
(45) Date of Patent: Sep. 5, 2023

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Satoshi Nagata, Tokyo (JP); Runxin Wang, Beijing (CN); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 264 days.

(21) Appl. No.: 17/421,655

(22) PCT Filed: Jan. 10, 2019

(86) PCT No.: PCT/JP2019/000560
§ 371 (c)(1),
(2) Date: Jul. 8, 2021

(87) PCT Pub. No.: WO2020/144818
PCT Pub. Date: Jul. 16, 2020

(65) Prior Publication Data
US 2022/0094488 A1    Mar. 24, 2022

(51) Int. Cl.
*H04L 5/00* (2006.01)
*H04W 72/00* (2023.01)

(52) U.S. Cl.
CPC ............ *H04L 5/006* (2013.01); *H04L 5/0032* (2013.01); *H04L 5/0042* (2013.01)

(58) Field of Classification Search
CPC .... H04W 72/20; H04W 72/23; H04W 72/232
See application file for complete search history.

(56) References Cited

U.S. PATENT DOCUMENTS

| | | | |
|---|---|---|---|
| 2013/0142125 | A1 | 6/2013 | Shimezawa et al. |
| 2014/0204871 | A1 | 7/2014 | Ode |
| 2015/0131634 | A1 | 5/2015 | Luo et al. |
| 2015/0373654 | A1 | 12/2015 | Yasukawa et al. |
| 2016/0337993 | A1 | 11/2016 | Takeda et al. |

(Continued)

FOREIGN PATENT DOCUMENTS

| | | |
|---|---|---|
| JP | 2012-054885 A | 3/2012 |
| JP | 2014-143608 A | 8/2014 |

(Continued)

OTHER PUBLICATIONS

Office Action issued in the counterpart Japanese Patent Application No. 2020-565113, dated Nov. 29, 2022 (10 pages).

(Continued)

*Primary Examiner* — Kevin Kim
(74) *Attorney, Agent, or Firm* — Osha Bergman Watanabe & Burton LLP

(57) ABSTRACT

A user terminal includes: a receiving section that receives information related to a plurality of resources respectively associated with a plurality of transmission points, wherein at least one of an offset and a guard domain is present between the plurality of resources; and a control section that performs communication with the plurality of transmission points based on the information. According to one aspect of the present disclosure, it is possible to appropriately perform communication that uses a plurality of transmission points.

10 Claims, 8 Drawing Sheets

(56) References Cited

U.S. PATENT DOCUMENTS

2018/0270799 A1 9/2018 Noh et al.
2019/0045490 A1* 2/2019 Davydov .............. H04L 5/0044

FOREIGN PATENT DOCUMENTS

| JP | 2014-535192 A | 12/2014 | |
|---|---|---|---|
| JP | 2015-126412 A | 7/2015 | |
| WO | 2013/024522 A1 | 2/2013 | |
| WO | WO-2018143702 A1 * | 8/2018 | ........... H04B 7/0617 |

OTHER PUBLICATIONS

Lenovo, Motorola Mobility, "Discussion of multi-panel/multi-TRP transmission", 3GPP TSG RAN WG1 Meeting #95, R1-1812784, Spokane, USA, Nov. 12-16, 2018 (5 pages).
International Search Report issued in corresponding International Patent Application No. PCT/JP2019/000560, dated Mar. 12, 2019 (2 pages).
Written Opinion issued in corresponding International Patent Application No. PCT/JP2019/000560, dated Mar. 12, 2019 (4 pages).
3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" Apr. 2010 (149 pages).
Office Action issued in the counterpart Japanese Patent Application No. 2020-565113, dated Feb. 21, 2023 (7 pages).
Huawei, HiSilicon, "Enhancements on multi-TRP/panel transmission in NR", 3GPP TSG RAN WG1 Meeting #94, R1-1809117, Gothenburg, Sweden, Aug. 20-24, 2018 (10 pages).
AT&T, "Overview of Multi-TRP/Panel Enhancements", 3GPP TSG RAN WG1 Meeting #95, R1-1812850, Spokane, USA, Nov. 12-16, 2018 (24 pages).
Extended European Search Report issued in European Application No. 19909510.0 dated Jun. 24, 2022 (9 pages).
Qualcomm Incorporated, "Multi-TRP Enhancements", 3GPP TSG-RAN WG1 Meeting #95, R1-1813442, Spokane, WA, USA, Nov. 12-16, 2018 (20 pages).
Huawei, HiSilicon, "Summary of AI: 7.2.8.2 Enhancements of Multi-TRP/Panel Transmission of Offline Discussion", 3GPP TSG RAN WG1 Meeting #95, R1-1814003, Spokane, USA, Nov. 12-16, 2018 (32 pages).

* cited by examiner

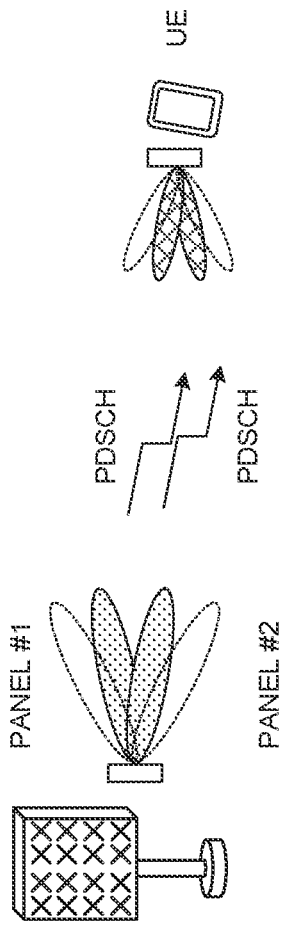
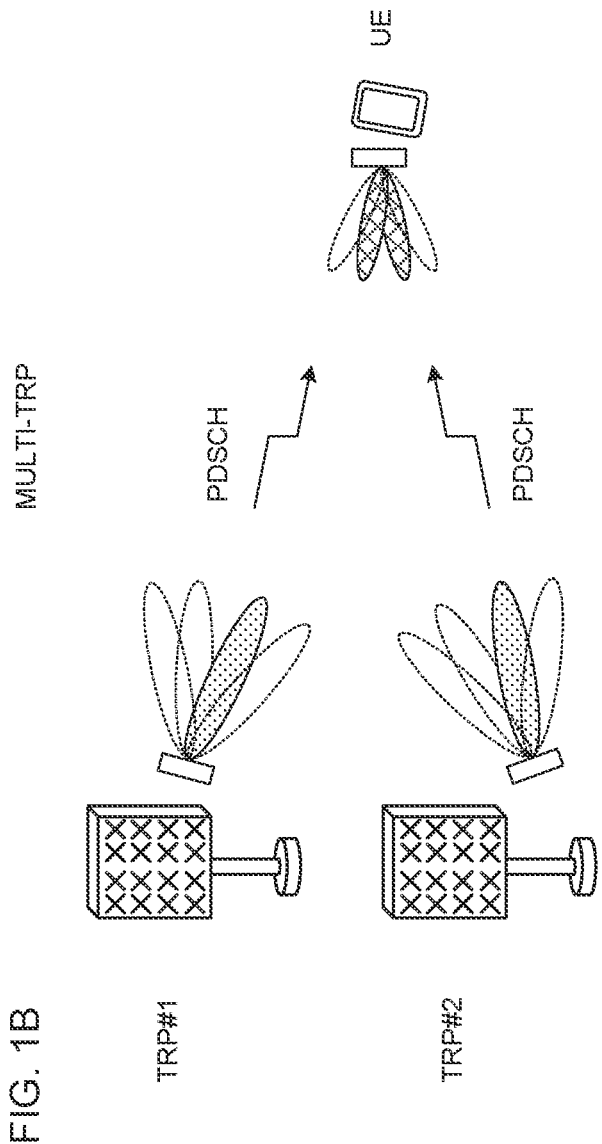
FIG. 1A
FIG. 1B

FIG. 3A

| UCI BIT VALUE | TIME OFFSET |
|---|---|
| 11 | T1 |
| 10 | T2 |
| 01 | T3 |
| 00 | T4 |

| UCI BIT VALUE | FREQUENCY OFFSET |
|---|---|
| 11 | F1 |
| 10 | F2 |
| 01 | F3 |
| 00 | F4 |

FIG. 3B

| UCI BIT VALUE | TIME OFFSET | FREQUENCY OFFSET |
|---|---|---|
| 11 | T1 | F1 |
| 10 | T2 | F2 |
| 01 | T3 | F3 |
| 00 | T4 | F4 |

USER TERMINAL AND RADIO COMMUNICATION METHOD

TECHNICAL FIELD

The present disclosure relates to a user terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for the purpose of a larger capacity and higher sophistication than those of LTE (Third Generation Partnership Project (3GPP) Releases (Rel.) 8 and 9), LTE-Advanced (3GPP Rel. 10 to 14) has been specified.

LTE successor systems (also referred to as, for example, the 5th generation mobile communication system (5G), 5G+ (plus), New Radio (NR) or 3GPP Rel. 15 or subsequent releases) are also studied.

In legacy LTE systems (e.g., LTE Rel. 8 to 14), a user terminal (User Equipment (UE)) controls reception of a downlink shared channel (e.g., Physical Downlink Shared Channel (PDSCH)) based on Downlink Control Information (also referred to as, for example, DCI or a DL assignment) conveyed via a downlink control channel (e.g., Physical Downlink Control Channel (PDCCH)). Furthermore, the user terminal controls transmission of an uplink shared channel (e.g., Physical Uplink Shared Channel (PUSCH)) based on DCI (also referred to as, for example, a UL grant).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)" April 2010

SUMMARY OF INVENTION

Technical Problem

It is studied for a future radio communication system (e.g., NR) to perform communication that uses a plurality of transmission points.

However, it is supposed that a plurality of transmission points do not synchronize due to an asynchronous network or a non-ideal backhaul. When a plurality of transmission points do not synchronize and a plurality of resources respectively used for a plurality of transmission points overlap, offsets between a plurality of these resources are generated in a time domain and a frequency domain There is a risk that such offsets deteriorate communication quality.

It is therefore one of objects of the present disclosure to provide a user terminal and a radio communication method that appropriately perform communication that uses a plurality of transmission points.

Solution to Problem

A user terminal according to one aspect of the present disclosure includes: a receiving section that receives information related to a plurality of resources respectively associated with a plurality of transmission points, wherein at least one of an offset and a guard domain is present between the plurality of resources; and a control section that performs communication with the plurality of transmission points based on the information.

Advantageous Effects of Invention

According to one aspect of the present disclosure, it is possible to appropriately perform communication that uses a plurality of transmission points.

BRIEF DESCRIPTION OF DRAWINGS

FIGS. 1A and 1B are diagrams illustrating one example of multi-TRP transmission.

FIGS. 3A and 3B are diagrams illustrating one example of an association between an offset value and a UCI bit.

DESCRIPTION OF EMBODIMENTS

Figure 2:
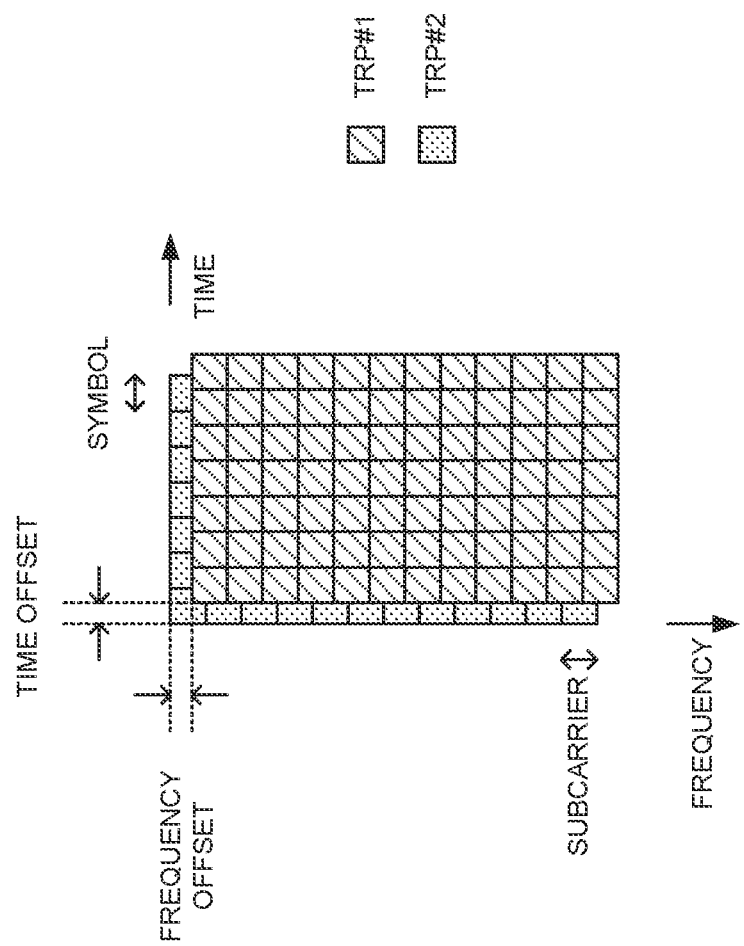
FIG. 2 is a diagram illustrating one example of a case where a plurality of resources associated with different TRPs overlap.

It is studied for future radio communication systems (e.g., Rel. 16 and subsequent releases) to perform non-coherent DL (e.g., PDSCH) transmission respectively from a plurality of transmission points. Transmitting non-coherent DL signals (or DL channels) from a plurality of transmission points in a coordinated manner may be referred to as Non-Coherent Joint Transmission (NCJT). Furthermore, in the present disclosure, the transmission point may be read as a Transmission/Reception Point (TRP), a panel (an antenna panel or a plurality of antenna elements), an antenna, an antenna port or a cell. The transmission point (such as a TRP or a panel) can be replaced with, for example, a beam, a spatial filter, a Reference Signal (RS) resource, Quasi Co-Location (QCL), a Transmission Configuration Indication (TCI) or a concept obtained by grouping these.

It is also assumed to control scheduling of non-coherent PDSCHs transmitted respectively from a plurality of transmission points by using 1 or more pieces of Downlink Control Information (DCI). In one example, at least one of pluralities of downlink control channels (e.g., PDCCHs) and pieces of DCI are used to schedule the PDSCHs transmitted from a plurality of transmission points.

FIGS. 1A and 1B illustrate one example of transmission (multi-TRP transmission) that uses a plurality of transmission points (panels or TRPs). FIG. 1A illustrates a case where PDSCHs (e.g., PDSCHs that use NCJT) are transmitted from a plurality of panels to a UE. FIG. 1B illustrates a case where PDSCHs (e.g., PDSCHs that use NCJT) are transmitted from a plurality of Transmission/Reception Points (TRPs) to the UE.

In this case, it is supposed that one TRP transmits one DCI for scheduling of the PDSCHs transmitted from a plurality of transmission points. Furthermore, it is also supposed that a plurality of TRPs transmit a plurality of pieces of DCI for scheduling of the PDSCH transmitted from each TRP. For example, there may be a configuration where first DCI #A for scheduling a PDSCH transmitted from a transmission point #A and second DCI #B for scheduling a PDSCH transmitted from a transmission point #B are transmitted to the UE.

Furthermore, during multi-TRP transmission, a plurality of PDSCHs may be transmitted in different Multiple Input Multiple Output (MIMO) layers. Furthermore, time resources and frequency resources of a plurality of PDSCHs may overlap.

The UE may be configured by a higher layer signaling (configuration information) to perform communication (e.g., multi-TRP transmission) that uses a plurality of TRPs. The UE may be notified of information (at least one of the higher layer signaling and the DCI) that indicates allocation of a plurality of resources respectively associated with a plurality of TRPs to perform communication that uses a plurality of TRPs.

A plurality of TRPs may belong to a synchronous network, or may belong to an asynchronous network. Furthermore, a plurality of TRPs may be connected via an ideal backhaul, or may be connected via a non-ideal backhaul.

In the asynchronous network, complete synchronization cannot be achieved between different TRPs. Synchronization cannot be achieved between a plurality of TRPs connected via the non-ideal backhaul, either.

It is supposed that a crystal oscillator has a frequency offset of 0.05 to 0.1 ppm (200 to 400 kHz for 4 GHz) in the synchronous network that uses the ideal backhaul. Therefore, it is supposed that a frequency offset up to 0.1 to 0.2 ppm is observed for a plurality of TRPs. Furthermore, it is supposed that a time adjustment error is 65 ns (at each carrier frequency) to 3 µs (during inter-band Carrier Aggregation (CA)) or less. Therefore, it is supposed that a time offset equal to or less than 130 ns to 6 µs is observed for a plurality of TRPs.

It is supposed in some scenarios of cases of a plurality of TRPs that there are offsets (errors or shifts) of frequency domains and time domains between resources allocated by different TRPs.

As illustrated in FIG. 2, it is supposed that there are a frequency offset and a time offset between a PDSCH resource allocated for a TRP #1 and a PDSCH resource allocated for a TRP #2, and at least part of the two resources overlap. In this case, it is supposed that a signal from the TRP #1 and a signal from the TRP #2 interfere, and communication quality deteriorates.

Hence, the inventors of the present disclosure have conceived that at least ones of offsets and guard domains are present between a plurality of resources respectively associated with a plurality of TRPs, and conceived performing communication with a plurality of transmission points based on information related to a plurality of resources. Consequently, it is possible to suppress an interference between a plurality of resources respectively associated with a plurality of TRPs. Embodiments according to the present disclosure will be described in detail below with reference to the drawings. Each following embodiment may be each applied alone or may be applied in combination.

In the present disclosure, a higher layer signaling may be, for example, one or a combination of, for example, a Radio Resource Control (RRC) signaling, a Medium Access Control (MAC) signaling and broadcast information.

The MAC signaling may use, for example, an MAC Control Element (MAC CE) or an MAC Protocol Data Unit (PDU). The broadcast information may be, for example, a Master Information Block (MIB), a System Information Block (SIB), Remaining Minimum System Information (RMSI) or Other System Information (OSI).

The following embodiments will describe cases where the present invention is applied to resources of a plurality of downlink signals (e.g., PDSCHs) associated with a plurality of TRPs. However, the present invention may be applied to resources of a plurality of uplink signals (e.g., PUSCHs) associated with a plurality of TRPs.

The TRP may be read as, for example, a transmission point, a DMRS port group, an MIMO layer, a panel, a cell, a carrier, a Component Carrier (CC) or a base station. The number of TRPs used for communication (e.g., multi-TRP transmission) that uses a plurality of TRPs may be 2, or may be 3 or more.

Multi-TRP transmission may be read as, for example, reception of a plurality of PDSCHs from different TRPs, reception of a plurality of PDSCHs associated with different DMRS port groups, a case where a plurality of DMRS port groups are configured, or a case where at least part of a plurality of PDSCH resources overlap.

A new parameter (such as a new higher layer parameter, a new DCI field, a new RNTI or a new UCI parameter) may be specified in a specific release (e.g., Rel. 16 and subsequent releases), and may be read as a parameter that is not specified in past releases (e.g., Rel. 15) before the specific release.

A plurality of resources associated with a plurality of TRPs (different TRPs) may be read as, for example, a plurality of resources allocated for the different TRPs, a plurality of resources used for the different TRPs, a plurality of resources allocated by the different TRPs, resources of a plurality of downlink signals (e.g., PDSCHs) transmitted by the different TRPs, or resources of a plurality of uplink signals (e.g., PUSCHs) received by the different TRPs.

An offset may be a difference between two resource locations (time domains or frequency domains), or may be an absolute value (magnitude) of the difference.

(Radio Communication Method)

Embodiment 1

When a plurality of resources associated with different TRPs overlap, thresholds (upper limits or maximum values) for limiting a frequency offset and a time offset may be used. The thresholds may be used for multi-TRP transmission. A base station can guarantee performance in a case where a plurality of TRPs are used by limiting the offsets by using the thresholds.

A frequency threshold for the frequency offset and a time threshold for the time offset may be used as the thresholds.

The thresholds may be specified in the specification. The thresholds may be configured to a UE by a higher layer parameter. The thresholds may differ according to at least one of a Subcarrier Spacing (SCS), a Frequency Range (FR), the number of TRPs and whether a cell to which a PDSCH is transmitted is a PCell or an SCell.

That at least part of a plurality of resources associated with different TRPs overlap may be configured to the UE by a higher layer parameter. The UE may be configured by a higher layer parameter to receive a plurality of PDSCHs at least part of which overlap respectively from the different TRPs.

At least one of the base station and the UE may judge whether or not an offset between a plurality of TRPs is the threshold or less according to one of next embodiments 1-1 and 1-2.

Embodiment 1-1

Notification, configuration and report for indicating that the offset is the threshold or less may not be performed between the base station and the UE.

The base station may determine which TRP is used for multi-TRP transmission. The base station may use for multi-TRP transmission a plurality of TRPs whose offsets become the threshold or less. The UE may assume that the offsets between a plurality of resources associated with all TRPs to be used are the threshold or less.

Embodiment 1-2

The UE may be triggered to make a report (offset report) related to the offset. The UE may make the offset report in response to the trigger. The base station may judge whether or not the offset is the threshold or less based on the offset report.

The offset report may be one of periodic, semi-persistent and non-periodic.

The offset report may be triggered by one of next embodiments 1-2-1 and 1-2-2.

Embodiment 1-2-1

The offset report may be triggered by a higher layer parameter.

The trigger may be at least one of next embodiments 1-2-1-1 to 1-2-1-3.

Embodiment 1-2-1-1

The trigger may be configured together with new configuration information for a TRP.

The configuration information may be information related to resource allocation. When, for example, overlapping resource allocation is configured, the offset report may be triggered.

The configuration information may be information related to one or a plurality of TRPs. When, for example, a plurality of TRPs are configured, the offset report may be triggered.

The configuration information may be information related to a DMRS port group (DMRS group) index. When, for example, the number of DMRS port groups is 2 or more, the offset report may be triggered.

Embodiment 1-2-1-2

The trigger may be configured together with a parameter (e.g., CSI-ReportConfig or CSI-ResourceConfig) related to CSI. For example, the parameter related to the CSI may include an additional field for configuring that the offset report is one of periodic, semi-persistent and non-periodic.

Embodiment 1-2-1-3

The trigger may be a new higher layer parameter.

Embodiment 1-2-2

The offset report may be triggered by DCI (L1 parameter).
The trigger may be at least one of next embodiments 1-2-2-1 and 1-2-2-2.

Embodiment 1-2-2-1

The offset report may be triggered by a new field in DCI for instructing whether or not the offset report is necessary. For example, the new field may be referred to as an "offset request" field. The DCI may be a DCI format 0_1 or may be other DCI formats.

Embodiment 1-2-2-2

The offset report may be triggered by a specific value of a CSI request field in DCI. For example, the specific value may be a bit sequence whose all bits are 1.

The UE may report information related to the frequency offset and the time offset by using UCI. The UE may transmit the UCI on a PUCCH or may transmit the UCI on a PUSCH. The UE may report one of next embodiments 1-2-3 and 1-2-4.

Embodiment 1-2-3

The UE may directly report the offset. The UE may calculate the offset based on a given downlink signal (e.g., a downlink RS or a CSI-RS), and report the calculated offset value as a new UCI parameter.

An association between the offset value and a UCI bit may be specified in a specification, or may be configured by an RRC signaling.

When multi-TRP transmission is configured to the UE, the UE may report UCI associated with the offset value. When multi-TRP transmission is not configured, the UE may not report the UCI associated with the offset value.

The UE may independently report UCI bits that indicate time offsets, and UCI bits that indicate frequency offsets. As illustrated in FIG. 3A, time offsets {T1, T2, T3, T4} may be associated with 2-bit UCI bits {11, 10, 01, 00}, and frequency offsets {F1, F2, F3, F4} may be associated with 2-bit UCI bits {11, 10, 01, 00}.

Values of the time offsets and the frequency offsets may be specified in the specification, or may be configured by a higher layer parameter.

The UE may report the UCI bits that indicate combinations of the time offsets and the frequency offsets. As illustrated in FIG. 3B, combinations of the time offsets {T1, T2, T3, T4} and the frequency offsets {F1, F2, F3, F4} may be associated with 2-bit UCI bits {11, 10, 01, 00}.

Embodiment 1-2-4

The UE may report information based on the offset. The UE may calculate the offset based on a given downlink signal (e.g., a downlink RS or a CSI-RS), and report whether or not the calculated offset value is the threshold or less.

According to above embodiment 1, when a plurality of resources associated with the different TRPs overlap, it is possible to suppress deterioration of performance by suppressing an offset to the threshold or less in the time domain and the frequency domain.

Embodiment 2

A base station and a UE may follow at least one of next embodiments 2-1 and 2-2 for a plurality of TRPs.

That a plurality of resources associated with different TRPs do not overlap may be configured to the UE by a higher layer parameter. The UE may be configured by a higher layer parameter to receive a plurality of PDSCHs that do not overlap from the different TRPs.

Embodiment 2-1

Use of a plurality of TRPs in an asynchronous network may not be supported.

The UE may not expect to receive PDSCHs transmitted from a plurality of TRPs based on at least one of the asynchronous network and a non-ideal backhaul.

By not using a plurality of TRPs in the asynchronous network, it is possible to prevent an interference between a plurality of TRPs and prevent deterioration of communication quality.

Embodiment 2-2

Guard domains may be used between a plurality of resources associated with the different TRPs.

Figure 4:
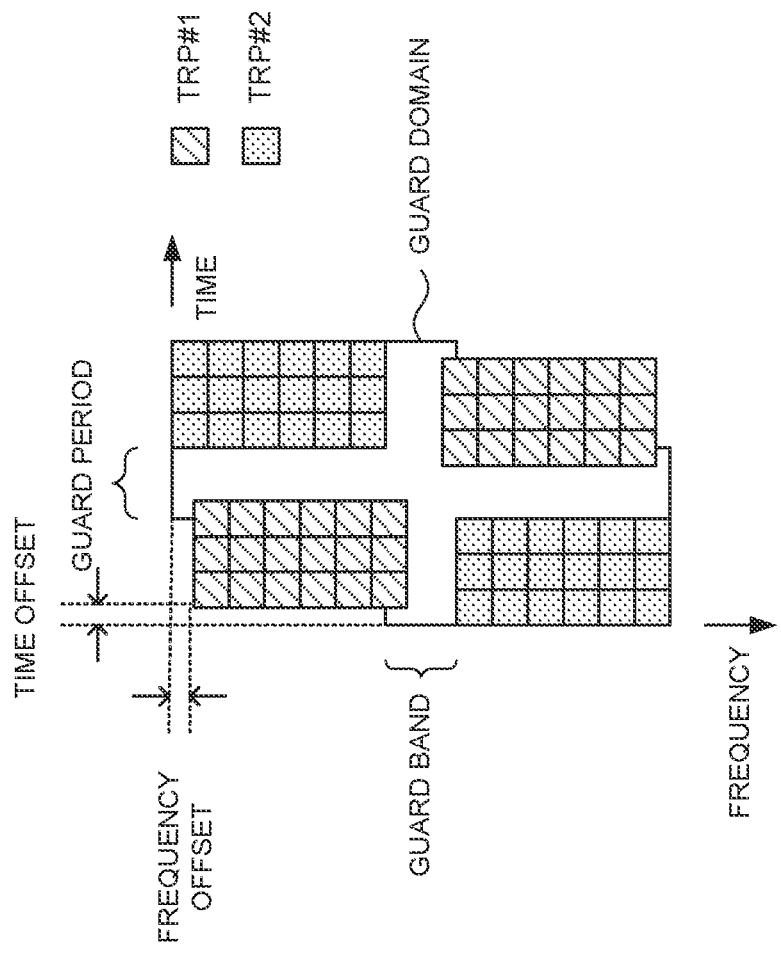
FIG. 4 is a diagram illustrating one example of a guard domain.

As illustrated in FIG. 4, the guard domain may be a resource on which a signal is not arranged. The guard domain may include at least one of a guard band that is a frequency resource, and a guard period that is a time resource. By this means, a plurality of resources associated with the different TRPs do not overlap. Time offsets and frequency offsets may be present between a plurality of resources associated with the different TRPs.

A plurality of resources associated with the different TRPs do not overlap the guard domain. The base station may schedule a plurality of PDSCHs associated with the different TRPs without using the guard domain.

The UE may be notified of information related to the guard domain in at least one of next embodiments 2-2-1 and 2-2-2.

Embodiment 2-2-1

The information related to the guard domain may be configured to the UE by a higher layer parameter.

A resource of the guard domain may be configured to the UE by a higher layer parameter. The higher layer parameter may be information that indicates a resource pattern (e.g., information that indicates a resource pattern for rate-matching a PDSCH, rateMatchPatternToAddModList, rateMatchPatternGroup1 or rateMatchPatternGroup2), or may be other higher layer parameters.

Embodiment 2-2-2

The information related to the guard domain may be instructed to the UE by DCI.

Whether or not the guard domain is configured (whether or not the guard domain is present) may be instructed to the UE by the DCI. Similar to embodiment 2-2-1, a resource or a plurality of candidate resources of the guard domain may be configured by a higher layer signaling, or may be specified in the specification. One of the candidate resources may be instructed to the UE by the DCI.

The instruction may be given to the UE by a new DCI field that indicates whether or not the guard domain is configured.

At least one of a rate matching indicator, frequency domain resource allocation, time domain resource allocation and a CRC may be scrambled in the DCI by a new Radio Network Temporary Identifier (RNTI). For the example, the new RNTI may be an RNTI different from a Cell (C)-RNTI, a Configured Scheduling (CS)-RNTI and a Modulation and Coding Scheme (MCS)-Cell (C)-RNTI. An instruction to configure the guard domain to the UE may be given to the UE by the DCI that uses the new RNTI, and an instruction to not configure the guard domain to the UE may be instructed to the UE by the DCI that does not use the new RNTI.

Others

The UE may not expect to demodulate (process) a PDSCH Resource Element (RE) in the guard domain. In other words, the UE may not expect that a time interval between a plurality of PDSCHs transmitted from the different TRPs is shorter than the guard period, or a frequency interval between a plurality of PDSCHs transmitted from the different TRPs is shorter than the guard band.

A frequency domain guard domain and a time domain guard domain may be independently configured to a frequency offset and a time offset for the UE. Consequently, it is possible to flexibly configure the guard domains.

Similar to embodiment 1-2, the UE may calculate offsets between a plurality of resources associated with the different TRPs, or report the offsets to the base station. The base station may determine the guard domains based on the offsets, or notify the UE of the information related to the guard domains similar to embodiments 2-2-1 and 2-2-2.

The UE may find the guard domains from the offsets without being configured with the guard domains. The frequency domain guard domain may be M times as the frequency offset. The time domain guard domain may be N times as the time offset. N and M may be the same or may be different. The guard domain is not configured, so that it is possible to suppress a signaling overhead.

By providing the guard domains, it is possible to avoid that a plurality of resources associated with a plurality of TRPs overlap each other. When being notified of the information related to the guard domains, the UE can appropriately process the guard domains.

Embodiment 3

A UE may report capability information related to at least ones of offsets and guard domains.

The UE may report at least one of pieces of next information as a capability signaling.

The UE can receive a plurality of PDSCHs (transmitted from different TRPs based on at least one of an asynchronous network and a non-ideal backhaul) having offsets (offsets equal to or more than a given value)

A time offset (or a threshold)

A frequency offset (or a threshold)

A size of a time domain guard domain (time duration)

A size of a frequency domain guard domain (bandwidth)

The UE may assume that offsets (a time domain and a frequency domain) between a plurality of PDSCHs transmitted respectively from the different TRPs do not exceed the reported offset (or threshold). The UE may assume that the sizes of the guard domains (the time domain and the frequency domain) between a plurality of PDSCHs transmitted respectively from the different TRPs do not exceed the reported sizes of the guard domains.

The UE may assume that thresholds (the time domain and the frequency domain) to be configured do not exceed the reported offsets (or thresholds). The UE may assume that guard domains (the time domain and the frequency domain) to be configured do not exceed the reported sizes of the guard domains.

According to above embodiment 3, it is possible to prevent deterioration of performance by processing at least one of the offsets and the guard domains that are suitable to UE capability.

(Radio Communication System)

The configuration of the radio communication system according to one embodiment of the present disclosure will be described below. This radio communication system uses one or a combination of the radio communication method according to each of the above embodiments of the present disclosure to perform communication.

Figure 5:
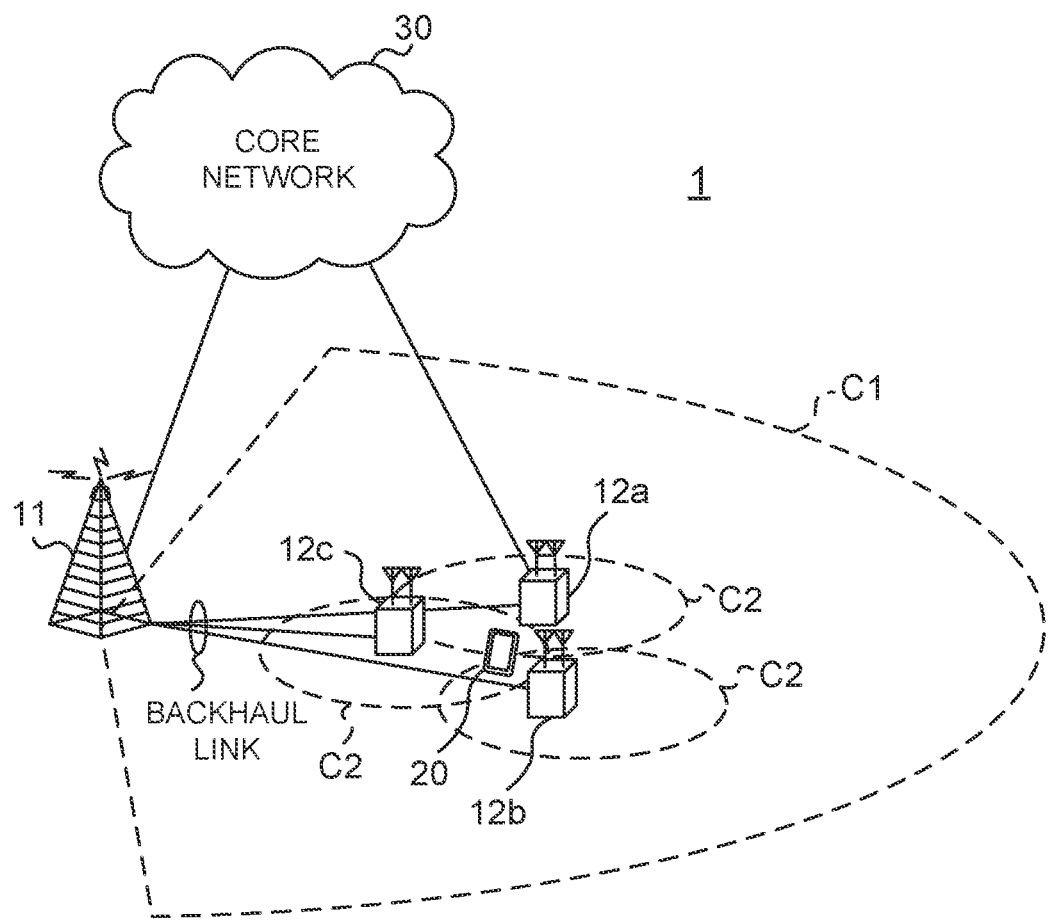
FIG. 5 is a diagram illustrating one example of a schematic configuration of a radio communication system according to one embodiment.

FIG. 5 is a diagram illustrating one example of a schematic configuration of the radio communication system according to the one embodiment. A radio communication system 1 may be a system that realizes communication by using Long Term Evolution (LTE) or the 5th generation mobile communication system New Radio (5G NR) specified by the Third Generation Partnership Project (3GPP).

Furthermore, the radio communication system 1 may support dual connectivity between a plurality of Radio Access Technologies (RATs) (Multi-RAT Dual Connectivity (MR-DC)). MR-DC may include dual connectivity (E-UTRA-NR Dual Connectivity (EN-DC)) of LTE (Evolved Universal Terrestrial Radio Access (E-UTRA)) and NR, and dual connectivity (NE-DC: NR-E-UTRA Dual Connectivity) of NR and LTE.

According to EN-DC, a base station (eNB) of LTE (E-UTRA) is a Master Node (MN), and a base station (gNB) of NR is a Secondary Node (SN). According to NE-DC, a base station (gNB) of NR is an MN, and a base station (eNB) of LTE (E-UTRA) is an SN.

The radio communication system 1 may support dual connectivity between a plurality of base stations in an identical RAT (e.g., dual connectivity (NR-NR Dual Connectivity (NN-DC)) where both of the MN and the SN are base stations (gNBs) according to NR).

The radio communication system 1 includes a base station 11 that forms a macro cell C1 of a relatively wide coverage, and base stations 12 (12a to 12c) that are located in the macro cell C1 and form small cells C2 narrower than the macro cell C1. The user terminal 20 may be located in at least one cell. An arrangement and the numbers of respective cells and the user terminals 20 are not limited to the aspect illustrated in FIG. 5. The base stations 11 and 12 will be collectively referred to as a base station 10 below when not distinguished.

The user terminal 20 may connect with at least one of a plurality of base stations 10. The user terminal 20 may use at least one of Carrier Aggregation (CA) and Dual Connectivity (DC) that use a plurality of Component Carriers (CCs).

Each CC may be included in at least one of a first frequency range (Frequency Range 1 (FR1)) and a second frequency range (Frequency Range 2 (FR2)). The macro cell C1 may be included in the FR1, and the small cell C2 may be included in the FR2. For example, the FR1 may be a frequency range equal to or less than 6 GHz (sub-6 GHz), and the FR2 may be a frequency range higher than 24 GHz (above-24 GHz). In addition, the frequency ranges and definitions of the FR1 and the FR2 are not limited to these, and, for example, the FR1 may correspond to a frequency range higher than the FR2.

Furthermore, the user terminal 20 may perform communication by using at least one of Time Division Duplex (TDD) and Frequency Division Duplex (FDD) in each CC.

A plurality of base stations 10 may be connected by way of wired connection (e.g., optical fibers compliant with a Common Public Radio Interface (CPRI) or an X2 interface) or radio connection (e.g., NR communication). When, for example, NR communication is used as a backhaul between the base stations 11 and 12, the base station 11 corresponding to a higher station may be referred to as an Integrated Access Backhaul (IAB) donor, and the base station 12 corresponding to a relay station (relay) may be referred to as an IAB node.

The base station 10 may be connected with a core network 30 via the another base station 10 or directly. The core network 30 may include at least one of, for example, an Evolved Packet Core (EPC), a 5G Core Network (SGCN) and a Next Generation Core (NGC).

The user terminal 20 is a terminal that supports at least one of communication schemes such as LTE, LTE-A and 5G.

The radio communication system 1 may use an Orthogonal Frequency Division Multiplexing (OFDM)-based radio access scheme. For example, on at least one of Downlink (DL) and Uplink (UL), Cyclic Prefix OFDM (CP-OFDM), Discrete Fourier Transform Spread OFDM (DFT-s-OFDM), Orthogonal Frequency Division Multiple Access (OFDMA) and Single Carrier Frequency Division Multiple Access (SC-FDMA) may be used.

The radio access scheme may be referred to as a waveform. In addition, the radio communication system 1 may use another radio access scheme (e.g., another single carrier transmission scheme or another multicarrier transmission scheme) as the radio access scheme on UL and DL.

The radio communication system 1 may use a downlink shared channel (Physical Downlink Shared Channel (PDSCH)) shared by each user terminal 20, a broadcast channel (Physical Broadcast Channel (PBCH)) and a downlink control channel (Physical Downlink Control Channel (PDCCH)) as downlink channels.

Furthermore, the radio communication system 1 may use an uplink shared channel (Physical Uplink Shared Channel (PUSCH)) shared by each user terminal 20, an uplink control channel (Physical Uplink Control Channel (PUCCH)) and a random access channel (Physical Random Access Channel (PRACH)) as uplink channels.

User data, higher layer control information and a System Information Block (SIB) are conveyed on the PDSCH. The user data and the higher layer control information may be conveyed on the PUSCH. Furthermore, a Master Information Block (MIB) may be conveyed on the PBCH.

Lower layer control information may be conveyed on the PDCCH. The lower layer control information may include, for example, Downlink Control Information (DCI) including scheduling information of at least one of the PDSCH and the PUSCH.

In addition, DCI for scheduling the PDSCH may be referred to as, for example, a DL assignment or DL DCI, and DCI for scheduling the PUSCH may be referred to as, for example, a UL grant or UL DCI. In this regard, the PDSCH may be read as DL data, and the PUSCH may be read as UL data.

A COntrol REsource SET (CORESET) and a search space may be used to detect the PDCCH. The CORESET corresponds to a resource for searching DCI. The search space corresponds to a search domain and a search method of PDCCH candidates. One CORESET may be associated with one or a plurality of search spaces. The UE may monitor a CORESET associated with a certain search space based on a search space configuration.

One search space may be associated with a PDCCH candidate corresponding to one or a plurality of aggregation levels. One or a plurality of search spaces may be referred to as a search space set. In addition, a "search space", a "search space set", a "search space configuration", a "search space set configuration", a "CORESET" and a "CORESET configuration" in the present disclosure may be interchangeably read.

Uplink Control Information (UCI) including at least one of Channel State Information (CSI), transmission acknowledgement information (that may be referred to as, for example, Hybrid Automatic Repeat reQuest ACKnowledgement (HARQ-ACK) or ACK/NACK) and a Scheduling Request (SR) may be conveyed on the PUCCH. A random access preamble for establishing connection with a cell may be conveyed on the PRACH.

In addition, downlink and uplink in the present disclosure may be expressed without adding "link" thereto. Furthermore, various channels may be expressed without adding "physical" to heads of the various channels.

The radio communication system 1 may convey a Synchronization Signal (SS) and a Downlink Reference Signal (DL-RS). The radio communication system 1 may convey a Cell-specific Reference Signal (CRS), a Channel State Information Reference Signal (CSI-RS), a DeModulation Reference Signal (DMRS), a Positioning Reference Signal (PRS) and a Phase Tracking Reference Signal (PTRS) as DL-RSs.

The synchronization signal may be at least one of, for example, a Primary Synchronization Signal (PSS) and a Secondary Synchronization Signal (SSS). A signal block including the SS (the PSS or the SSS) and the PBCH (and the DMRS for the PBCH) may be referred to as, for example, an SS/PBCH block or an SS Block (SSB). In addition, the SS and the SSB may be also referred to as reference signals.

Furthermore, the radio communication system 1 may convey a Sounding Reference Signal (SRS) and a DeModulation Reference Signal (DMRS) as UpLink Reference Signals (UL-RSs). In this regard, the DMRS may be referred to as a user terminal-specific reference signal (UE-specific reference signal).

(Base Station)

Figure 6:
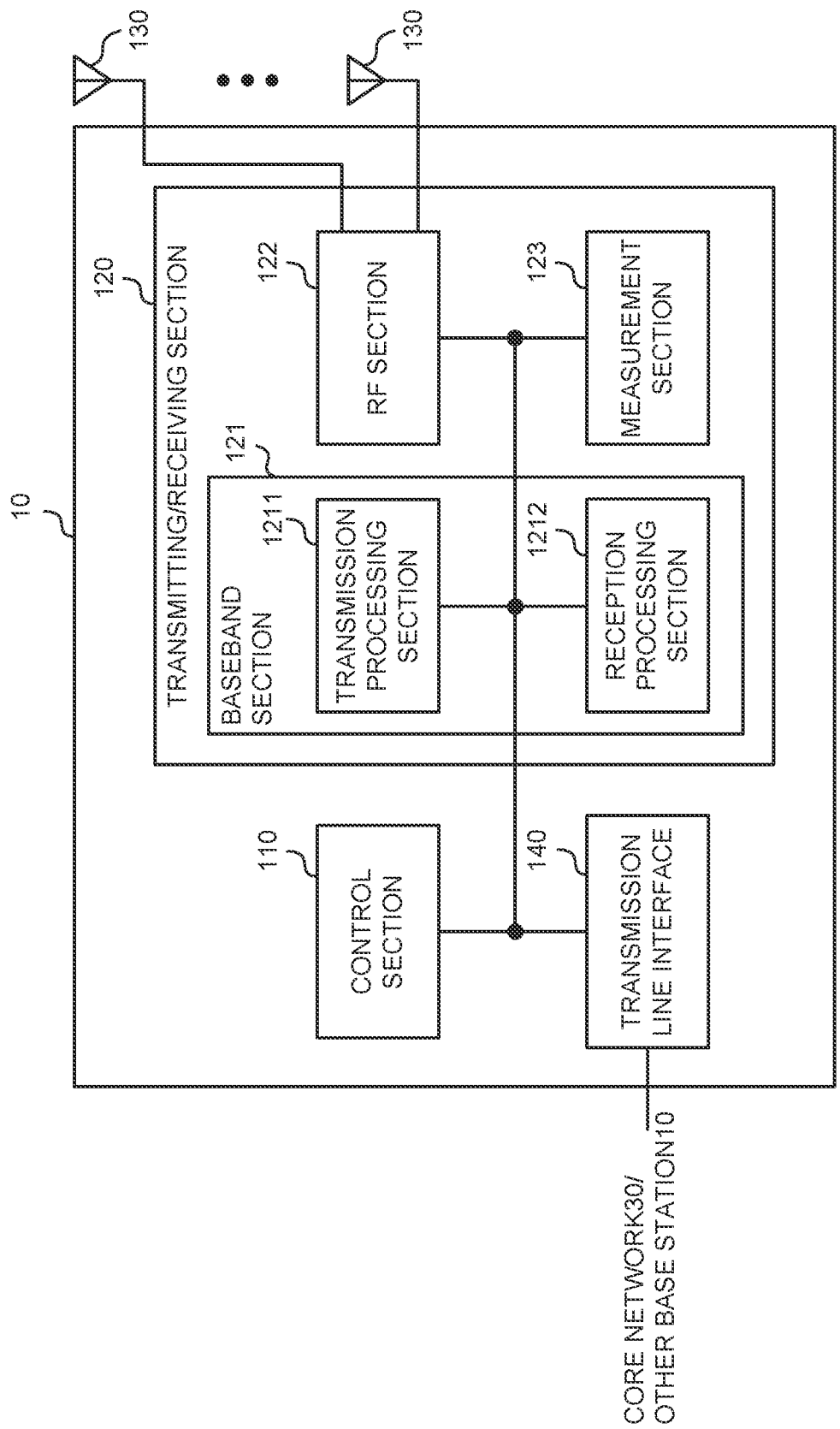
FIG. 6 is a diagram illustrating one example of a configuration of a base station according to the one embodiment.

FIG. 6 is a diagram illustrating one example of a configuration of the base station according to the one embodiment. The base station 10 includes a control section 110, a transmitting/receiving section 120, transmission/reception antennas 130 and a transmission line interface 140. In addition, the base station 10 may include one or more of each of the control sections 110, the transmitting/receiving sections 120, the transmission/reception antennas 130 and the transmission line interfaces 140.

In addition, this example mainly illustrates function blocks of characteristic portions according to the present embodiment, and may assume that the base station 10 includes other function blocks, too, that are necessary for radio communication. Part of processing of each section described below may be omitted.

The control section 110 controls the entire base station 10. The control section 110 can be composed of a controller or a control circuit described based on the common knowledge in the technical field according to the present disclosure.

The control section 110 may control signal generation and scheduling (e.g., resource allocation or mapping). The control section 110 may control transmission/reception and measurement that use the transmitting/receiving section 120, the transmission/reception antennas 130 and the transmission line interface 140. The control section 110 may generate data, control information or a sequence to be transmitted as a signal, and forward the signal to the transmitting/receiving section 120. The control section 110 may perform call processing (such as configuration and release) of a communication channel, state management of the base station 10 and radio resource management.

The transmitting/receiving section 120 may include a baseband section 121, a Radio Frequency (RF) section 122 and a measurement section 123. The baseband section 121 may include a transmission processing section 1211 and a reception processing section 1212. The transmitting/receiving section 120 can be composed of a transmitter/receiver, an RF circuit, a baseband circuit, a filter, a phase shifter, a measurement circuit and a transmission/reception circuit described based on the common knowledge in the technical field according to the present disclosure.

The transmitting/receiving section 120 may be composed as an integrated transmitting/receiving section, or may be composed of a transmitting section and a receiving section. The transmitting section may be composed of the transmission processing section 1211 and the RF section 122. The receiving section may be composed of the reception processing section 1212, the RF section 122 and the measurement section 123.

The transmission/reception antenna 130 can be composed of an antenna such as an array antenna described based on the common knowledge in the technical field according to the present disclosure.

The transmitting/receiving section 120 may transmit the above-described downlink channel, synchronization signal and downlink reference signal. The transmitting/receiving section 120 may receive the above-described uplink channel and uplink reference signal.

The transmitting/receiving section 120 may form at least one of a transmission beam and a reception beam by using digital beam forming (e.g., precoding) or analog beam forming (e.g., phase rotation).

The transmitting/receiving section 120 (transmission processing section 1211) may perform Packet Data Convergence Protocol (PDCP) layer processing, Radio Link Control (RLC) layer processing (e.g., RLC retransmission control), and Medium Access Control (MAC) layer processing (e.g., HARQ retransmission control) on, for example, the data and the control information obtained from the control section 110, and generate a bit sequence to transmit.

The transmitting/receiving section 120 (transmission processing section 1211) may perform transmission processing such as channel coding (that may include error correction coding), modulation, mapping, filter processing, Discrete Fourier Transform (DFT) processing (when needed), Inverse Fast Fourier Transform (IFFT) processing, precoding and digital-analog conversion on the bit sequence to transmit, and output a baseband signal.

The transmitting/receiving section 120 (RF section 122) may modulate the baseband signal into a radio frequency range, perform filter processing and amplification on the signal, and transmit the signal of the radio frequency range via the transmission/reception antennas 130.

On the other hand, the transmitting/receiving section 120 (RF section 122) may perform amplification and filter processing on the signal of the radio frequency range received by the transmission/reception antennas 130, and demodulate the signal into a baseband signal.

The transmitting/receiving section 120 (reception processing section 1212) may apply reception processing such as analog-digital conversion, Fast Fourier Transform (FFT) processing, Inverse Discrete Fourier Transform (IDFT) processing (when needed), filter processing, demapping, demodulation, decoding (that may include error correction decoding), MAC layer processing, RLC layer processing and PDCP layer processing to the obtained baseband signal, and obtain user data.

The transmitting/receiving section 120 (measurement section 123) may perform measurement related to the received signal. For example, the measurement section 123 may perform Radio Resource Management (RRM) measurement or Channel State Information (CSI) measurement based on the received signal. The measurement section 123 may measure received power (e.g., Reference Signal Received Power (RSRP)), received quality (e.g., Reference Signal Received Quality (RSRQ), a Signal to Interference plus Noise Ratio (SINR) or a Signal to Noise Ratio (SNR)), a signal strength (e.g., a Received Signal Strength Indicator (RSSI)) or channel information (e.g., CSI). The measurement section 123 may output a measurement result to the control section 110.

The transmission line interface 140 may transmit and receive (backhaul signaling) signals to and from apparatuses and the other base stations 10 included in the core network 30, and obtain and convey user data (user plane data) and control plane data for the user terminal 20.

In addition, the transmitting section and the receiving section of the base station 10 according to the present disclosure may be composed of at least one of the transmitting/receiving section 120 and the transmission/reception antenna 130.

Furthermore, the control section 110 may perform communication (e.g., multi-TRP transmission) that uses a plurality of resources respectively associated with a plurality of transmission points by using a plurality of transmission points whose offsets are a threshold or less. At least part of a plurality of resources may overlap. The control section 110 may determine a plurality of transmission points whose offsets are the threshold or less based on an offset reported from the UE.

Furthermore, the control section 110 may configure guard domains between a plurality of resources respectively associated with a plurality of transmission points to the UE.

Furthermore, the control section 110 may perform communication (e.g., multi-TRP transmission) that uses a plurality of transmission points based on capability information reported from the UE.

(User Terminal)

Figure 7:
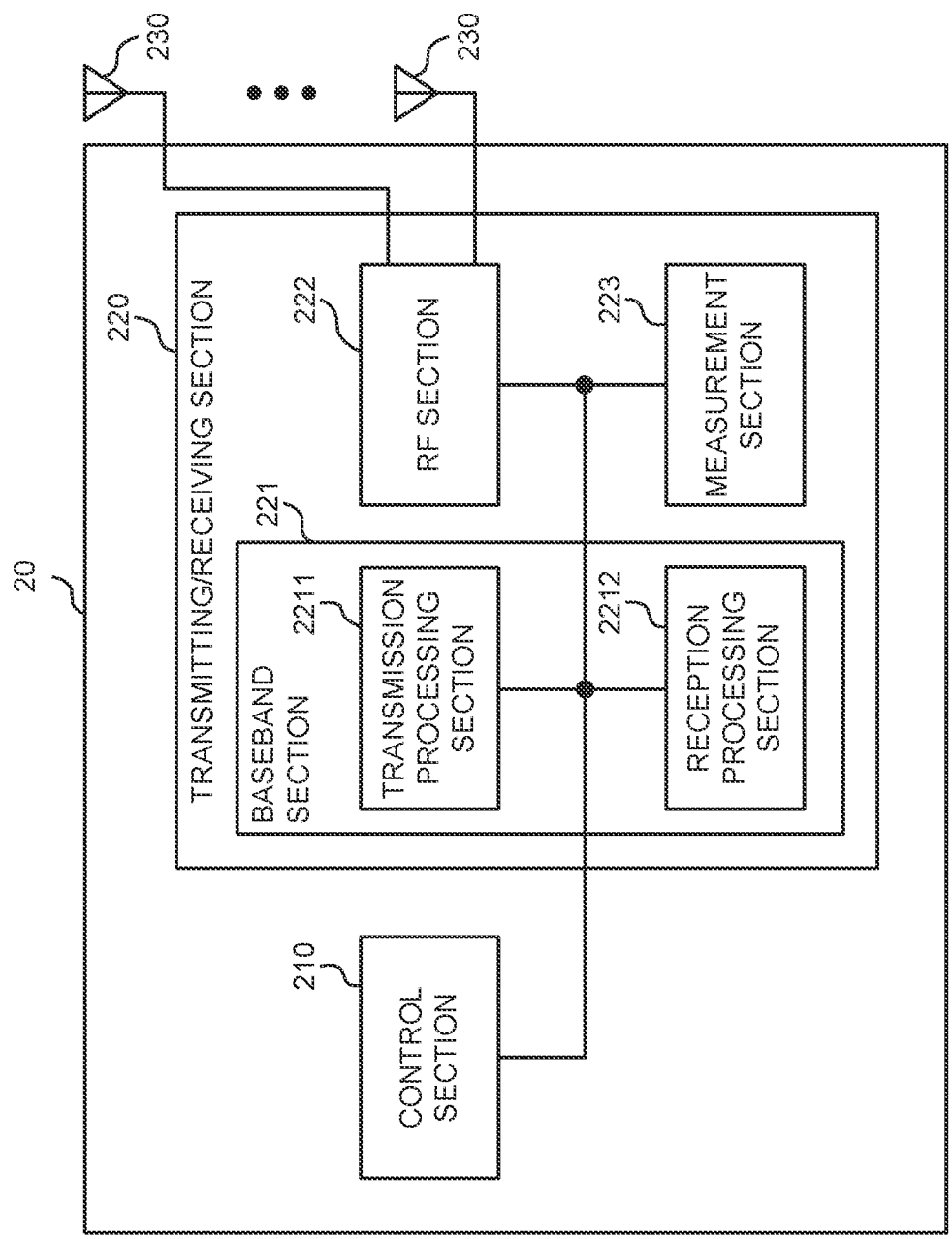
FIG. 7 is a diagram illustrating one example of a configuration of a user terminal according to the one embodiment.

FIG. 7 is a diagram illustrating one example of a configuration of the user terminal according to the one embodiment. The user terminal 20 includes a control section 210, a transmitting/receiving section 220 and transmission/reception antennas 230. In this regard, the user terminal 20 may include one or more of each of the control sections 210, the transmitting/receiving sections 220 and the transmission/reception antennas 230. In addition, this example mainly illustrates function blocks of characteristic portions according to the present embodiment, and may assume that the user terminal 20 includes other function blocks, too, that are necessary for radio communication. Part of processing of each section described below may be omitted.

The control section 210 controls the entire user terminal 20. The control section 210 can be composed of a controller or a control circuit described based on the common knowledge in the technical field according to the present disclosure.

The control section 210 may control signal generation and mapping. The control section 210 may control transmission/reception and measurement that use the transmitting/receiving section 220 and the transmission/reception antennas 230. The control section 210 may generate data, control information or a sequence to be transmitted as a signal, and forward the signal to the transmitting/receiving section 220.

The transmitting/receiving section 220 may include a baseband section 221, an RF section 222 and a measurement section 223. The baseband section 221 may include a transmission processing section 2211 and a reception processing section 2212. The transmitting/receiving section 220 can be composed of a transmitter/receiver, an RF circuit, a baseband circuit, a filter, a phase shifter, a measurement circuit and a transmission/reception circuit described based on the common knowledge in the technical field according to the present disclosure.

The transmitting/receiving section 220 may be composed as an integrated transmitting/receiving section, or may be composed of a transmitting section and a receiving section. The transmitting section may be composed of the transmission processing section 2211 and the RF section 222. The receiving section may be composed of the reception processing section 2212, the RF section 222 and the measurement section 223.

The transmission/reception antenna 230 can be composed of an antenna such as an array antenna described based on the common knowledge in the technical field according to the present disclosure.

The transmitting/receiving section 220 may receive the above-described downlink channel, synchronization signal and downlink reference signal. The transmitting/receiving section 220 may transmit the above-described uplink channel and uplink reference signal.

The transmitting/receiving section 220 may form at least one of a transmission beam and a reception beam by using digital beam forming (e.g., precoding) or analog beam forming (e.g., phase rotation).

The transmitting/receiving section 220 (transmission processing section 2211) may perform PDCP layer processing, RLC layer processing (e.g., RLC retransmission control) and MAC layer processing (e.g., HARQ retransmission control) on, for example, the data and the control information obtained from the control section 210, and generate a bit sequence to transmit.

The transmitting/receiving section 220 (transmission processing section 2211) may perform transmission processing such as channel coding (that may include error correction coding), modulation, mapping, filter processing, DFT processing (when needed), IFFT processing, precoding and digital-analog conversion on the bit sequence to transmit, and output a baseband signal.

In this regard, whether or not to apply the DFT processing may be based on a configuration of transform precoding. When transform precoding is enabled for a certain channel (e.g., PUSCH), the transmitting/receiving section 220 (transmission processing section 2211) may perform the DFT processing as the above transmission processing to transmit the certain channel by using a DFT-s-OFDM waveform. When precoding is not enabled, the transmitting/receiving section 220 (transmission processing section 2211) may not perform the DFT processing as the above transmission processing.

The transmitting/receiving section 220 (RF section 222) may modulate the baseband signal into a radio frequency range, perform filter processing and amplification on the signal, and transmit the signal of the radio frequency range via the transmission/reception antennas 230.

On the other hand, the transmitting/receiving section 220 (RF section 222) may perform amplification and filter processing on the signal of the radio frequency range received by the transmission/reception antennas 230, and demodulate the signal into a baseband signal.

The transmitting/receiving section 220 (reception processing section 2212) may apply reception processing such as analog-digital conversion, FFT processing, IDFT processing (when needed), filter processing, demapping, demodulation, decoding (that may include error correction decoding), MAC layer processing, RLC layer processing and PDCP layer processing to the obtained baseband signal, and obtain user data.

The transmitting/receiving section 220 (measurement section 223) may perform measurement related to the received signal. For example, the measurement section 223 may perform, for example, RRM measurement or CSI measurement based on the received signal. The measurement section 223 may measure, for example, received power (e.g., RSRP), received quality (e.g., RSRQ, an SINR or an SNR), a signal strength (e.g., RSSI) or channel information (e.g., CSI). The measurement section 223 may output a measurement result to the control section 210.

In addition, the transmitting section and the receiving section of the user terminal 20 according to the present disclosure may be composed of at least one of the transmitting/receiving section 220, the transmission/reception antenna 230 and the transmission line interface 240.

Furthermore, the transmitting/receiving section 220 may receive information (at least one of configuration of multi-TRP transmission, allocation of a plurality of resources, triggering of an offset report, guard domain resources and whether or not guard domains are present) related to a plurality of resources (e.g., PDSCH REs) respectively associated with a plurality of transmission points (e.g., TRPs, panels or antennas). At least one of an offset (at least one of the time offset and the frequency offset) and the guard domain (at least one of a time domain guard domain and a frequency domain guard domain) may be present between a plurality of these resources. The control section 210 may perform communication (e.g., multi-TRP transmission) with a plurality of these transmission points based on the information.

Furthermore, when at least part of a plurality of these resources overlap, the control section 210 may assume that the offset is the threshold or less (embodiment 1-1).

Furthermore, the control section 210 may calculate the offset, and report the offset (embodiment 1-2).

Furthermore, the information may indicate at least one of the guard domain resource and that the guard domain is configured (embodiment 2).

Furthermore, the control section 210 may report capability related to at least one of the offset and the guard domain (embodiment 3).

(Hardware Configuration)

In addition, the block diagrams used to describe the above embodiments illustrate blocks in function units. These function blocks (components) are realized by an arbitrary combination of at least ones of hardware components and software components. Furthermore, a method for realizing each function block is not limited in particular. That is, each function block may be realized by using one physically or logically coupled apparatus or may be realized by connecting two or more physically or logically separate apparatuses directly or indirectly (by using, for example, wired connection or radio connection) and using a plurality of these apparatuses. Each function block may be realized by combining software with the above one apparatus or a plurality of above apparatuses.

In this regard, the functions include deciding, determining, judging, calculating, computing, processing, deriving, investigating, looking up, ascertaining, receiving, transmitting, outputting, accessing, resolving, selecting, choosing, establishing, comparing, assuming, expecting, considering, broadcasting, notifying, communicating, forwarding, configuring, reconfiguring, allocating, mapping, and assigning, yet are not limited to these. For example, a function block (component) that causes transmission to function may be referred to as, for example, a transmitting unit or a transmitter. As described above, the method for realizing each function block is not limited in particular.

Figure 8:
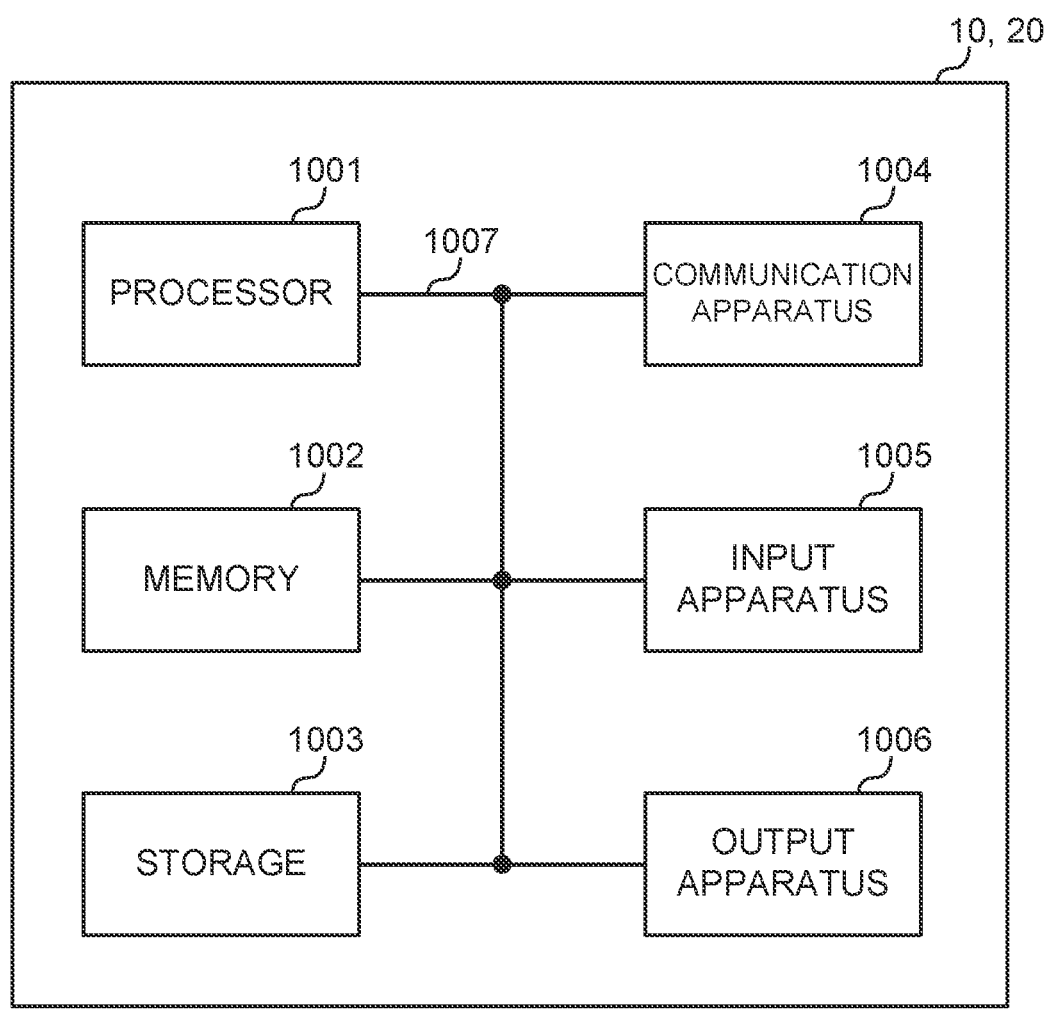
FIG. 8 is a diagram illustrating one example of hardware configurations of the base station and the user terminal according to the one embodiment.

For example, the base station and the user terminal according to the one embodiment of the present disclosure may function as computers that perform processing of the radio communication method according to the present disclosure. FIG. 8 is a diagram illustrating one example of the hardware configurations of the base station and the user terminal according to the one embodiment. The above-described base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, words such as an apparatus, a circuit, a device, a section and a unit in the present disclosure can be interchangeably read. The hardware configurations of the base station 10 and the user terminal 20 may be configured to include one or a plurality of apparatuses illustrated in FIG. 8 or may be configured without including part of the apparatuses.

For example, FIG. 8 illustrates the only one processor 1001. However, there may be a plurality of processors. Furthermore, processing may be executed by 1 processor or processing may be executed by 2 or more processors simultaneously or successively or by using another method. In addition, the processor 1001 may be implemented by 1 or more chips.

Each function of the base station 10 and the user terminal 20 is realized by, for example, causing hardware such as the processor 1001 and the memory 1002 to read given software (program), and thereby causing the processor 1001 to perform an operation, and control communication via the communication apparatus 1004 and control at least one of reading and writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, at least part of the above-described control section 110 (210) and transmitting/receiving section 120 (220) may be realized by the processor 1001.

Furthermore, the processor 1001 reads programs (program codes), software modules or data from at least one of the storage 1003 and the communication apparatus 1004 out to the memory 1002, and executes various types of processing according to these programs, software modules or data. As the programs, programs that cause the computer to execute at least part of the operations described in the above-described embodiments are used. For example, the control section 110 (210) may be realized by a control program that is stored in the memory 1002 and operates on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as, for example, a register, a cache or a main memory (main storage apparatus). The memory 1002 can store programs (program codes) and software modules that can be executed to perform the radio communication method according to the one embodiment of the present disclosure.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via at least one of a wired network and a radio network, and is also referred to as, for example, a network device, a network controller, a network card and a communication module. The communication apparatus 1004 may be configured to include a high frequency switch, a duplexer, a filter and a frequency synthesizer to realize at least one of, for example, Frequency Division Duplex (FDD) and Time Division Duplex (TDD). For example, the above-described transmitting/receiving section 120 (220) and transmission/reception antennas 130 (230) may be realized by the communication apparatus 1004. The transmitting/receiving section 120 (220) may be physically or logically separately implemented as a transmitting section 120a (220a) and a receiving section 120b (220b).

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using different buses between apparatuses.

Furthermore, the base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or entirety of each function block. For example, the processor 1001 may be implemented by using at least one of these hardware components.

Modified Example

In addition, each term that has been described in the present disclosure and each term that is necessary to understand the present disclosure may be replaced with terms having identical or similar meanings. For example, a channel, a symbol and a signal (a signal or a signaling) may be interchangeably read. Furthermore, a signal may be a message. A reference signal can be also abbreviated as an RS, or may be referred to as a pilot or a pilot signal depending on standards to be applied. Furthermore, a Component Carrier (CC) may be referred to as, for example, a cell, a frequency carrier and a carrier frequency.

A radio frame may include one or a plurality of durations (frames) in a time domain Each of one or a plurality of durations (frames) that makes up a radio frame may be referred to as a subframe. Furthermore, the subframe may include one or a plurality of slots in the time domain. The subframe may be a fixed time duration (e.g., 1 ms) that does not depend on a numerology.

In this regard, the numerology may be a communication parameter to be applied to at least one of transmission and reception of a certain signal or channel. The numerology may indicate at least one of, for example, a SubCarrier Spacing (SCS), a bandwidth, a symbol length, a cyclic prefix length, a Transmission Time Interval (TTI), the number of symbols per TTI, a radio frame configuration, specific filtering processing performed by a transceiver in a frequency domain, and specific windowing processing performed by the transceiver in a time domain.

The slot may include one or a plurality of symbols (Orthogonal Frequency Division Multiplexing (OFDM) symbols or Single Carrier Frequency Division Multiple Access (SC-FDMA) symbols) in the time domain. Furthermore, the slot may be a time unit based on the numerology.

The slot may include a plurality of mini slots. Each mini slot may include one or a plurality of symbols in the time domain. Furthermore, the mini slot may be referred to as a subslot. The mini slot may include a smaller number of symbols than that of the slot. The PDSCH (or the PUSCH) to be transmitted in larger time units than that of the mini slot may be referred to as a PDSCH (PUSCH) mapping type A. The PDSCH (or the PUSCH) to be transmitted by using the mini slot may be referred to as a PDSCH (PUSCH) mapping type B.

The radio frame, the subframe, the slot, the mini slot and the symbol each indicate a time unit for conveying signals. The other corresponding names may be used for the radio frame, the subframe, the slot, the mini slot and the symbol. In addition, time units such as a frame, a subframe, a slot, a mini slot and a symbol in the present disclosure may be interchangeably read.

For example, 1 subframe may be referred to as a TTI, a plurality of contiguous subframes may be referred to as TTIs, or 1 slot or 1 mini slot may be referred to as a TTI. That is, at least one of the subframe and the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as, for example, a slot or a mini slot instead of a subframe.

In this regard, the TTI refers to, for example, a minimum time unit of scheduling of radio communication. For example, in the LTE system, the base station performs scheduling for allocating radio resources (a frequency bandwidth or transmission power that can be used in each user terminal) in TTI units to each user terminal. In this regard, a definition of the TTI is not limited to this.

The TTI may be a transmission time unit of a channel-coded data packet (transport block), code block or codeword, or may be a processing unit of scheduling or link adaptation. In addition, when the TTI is given, a time period (e.g., the number of symbols) in which a transport block, a code block or a codeword is actually mapped may be shorter than the TTI.

In addition, when 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that make up a minimum time unit of the scheduling may be controlled.

The TTI having the time duration of 1 ms may be referred to as, for example, a general TTI (TTIs according to 3GPP Rel. 8 to 12), a normal TTI, a long TTI, a general subframe, a normal subframe, a long subframe or a slot. A TTI shorter than the general TTI may be referred to as, for example, a reduced TTI, a short TTI, a partial or fractional TTI, a reduced subframe, a short subframe, a mini slot, a subslot or a slot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

A Resource Block (RB) is a resource allocation unit of the time domain and the frequency domain, and may include one or a plurality of contiguous subcarriers in the frequency domain. The numbers of subcarriers included in RBs may be the same irrespectively of a numerology, and may be, for example, 12. The numbers of subcarriers included in the RBs may be determined based on the numerology.

Furthermore, the RB may include one or a plurality of symbols in the time domain or may have the length of 1 slot, 1 mini slot, 1 subframe or 1 TTI. 1 TTI or 1 subframe may each include one or a plurality of resource blocks.

In this regard, one or a plurality of RBs may be referred to as, for example, a Physical Resource Block (Physical RB (PRB)), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

A Bandwidth Part (BWP) (that may be referred to as, for example, a partial bandwidth) may mean a subset of contiguous common Resource Blocks (common RBs) for a certain numerology in a certain carrier. In this regard, the common RB may be specified by an RB index based on a common reference point of the certain carrier. A PRB may be defined based on a certain BWP, and may be numbered in the certain BWP.

The BWP may include a UL BWP (a BWP for UL) and a DL BWP (a BWP for DL). One or a plurality of BWPs in 1 carrier may be configured to the UE.

At least one of the configured BWPs may be active, and the UE may not assume to transmit and receive given signals/channels outside the active BWP. In addition, a "cell" and a "carrier" in the present disclosure may be read as a "BWP".

In this regard, structures of the above-described radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and the parameters described in the present disclosure may be expressed by using absolute values, may be expressed by using relative values with respect to given values or may be expressed by using other corresponding information. For example, a radio resource may be instructed by a given index.

Names used for parameters in the present disclosure are in no respect restrictive names. Furthermore, numerical expressions that use these parameters may be different from those explicitly disclosed in the present disclosure. Various channels (the PUCCH and the PDCCH) and information elements can be identified based on various suitable names Therefore, various names assigned to these various channels and information elements are in no respect restrictive names.

The information and the signals described in the present disclosure may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or arbitrary combinations of these.

Furthermore, the information and the signals can be output at least one of from a higher layer to a lower layer and from the lower layer to the higher layer. The information and the signals may be input and output via a plurality of network nodes.

The input and output information and signals may be stored in a specific location (e.g., memory) or may be managed by using a management table. The information and signals to be input and output can be overridden, updated or additionally written. The output information and signals may be deleted. The input information and signals may be transmitted to other apparatuses.

Notification of information is not limited to the aspect/embodiments described in the present disclosure and may be performed by using other methods. For example, the information may be notified in the present disclosure by a physical layer signaling (e.g., Downlink Control Information (DCI) and Uplink Control Information (UCI)), a higher layer signaling (e.g., a Radio Resource Control (RRC) signaling, broadcast information (such as a Master Information Block (MIB) and a System Information Block (SIB)), and a Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") is not limited to explicit notification, and may be given implicitly (by, for example, not giving notification of the given information or by giving notification of another information).

Judgement may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or is referred to as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using at least ones of wired techniques (e.g., coaxial cables, optical fiber cables, twisted pairs and Digital Subscriber Lines (DSLs)) and radio techniques (e.g., infrared rays and microwaves), at least ones of these wired techniques and radio techniques are included in a definition of the transmission media.

The terms "system" and "network" used in the present disclosure can be interchangeably used. The "network" may mean an apparatus (e.g., base station) included in the network.

In the present disclosure, terms such as "precoding", a "precoder", a "weight (precoding weight)", "Quasi-Co-Location (QCL)", a "Transmission Configuration Indication state (TCI state)", a "spatial relation", a "spatial domain filter", "transmission power", "phase rotation", an "antenna port", an "antenna port group", a "layer", "the number of layers", a "rank", a "resource", a "resource set", a "resource group", a "beam", a "beam width", a "beam angle", an "antenna", an "antenna element" and a "panel" can be interchangeably used.

In the present disclosure, terms such as a "Base Station (BS)", a "radio base station", a "fixed station", a "NodeB", an "eNodeB (eNB)", a "gNodeB (gNB)", an "access point", a "Transmission Point (TP)", a "Reception Point (RP)", a "Transmission/Reception Point (TRP)", a "panel", a "cell", a "sector", a "cell group", a "carrier" and a "component carrier" can be interchangeably used. The base station is also referred to as terms such as a macro cell, a small cell, a femtocell or a picocell.

The base station can accommodate one or a plurality of (e.g., three) cells. When the base station accommodates a plurality of cells, an entire coverage area of the base station can be partitioned into a plurality of smaller areas. Each smaller area can also provide a communication service via a base station subsystem (e.g., indoor small base station (RRH: Remote Radio Head)). The term "cell" or "sector" indicates part or the entirety of the coverage area of at least one of the base station and the base station subsystem that provide a communication service in this coverage.

In the present disclosure, the terms such as "Mobile Station (MS)", "user terminal", "user apparatus (UE: User Equipment)" and "terminal" can be interchangeably used.

The mobile station is also referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

At least one of the base station and the mobile station may be referred to as, for example, a transmission apparatus, a reception apparatus or a radio communication apparatus. In addition, at least one of the base station and the mobile station may be, for example, a device mounted on a movable body or the movable body itself. The movable body may be a vehicle (e.g., a car or an airplane), may be a movable body (e.g., a drone or a self-driving car) that moves unmanned or may be a robot (a manned type or an unmanned type). In addition, at least one of the base station and the mobile station includes an apparatus, too, that does not necessarily move during a communication operation. For example, at least one of the base station and the mobile station may be an Internet of Things (IoT) device such as a sensor.

Furthermore, the base station in the present disclosure may be read as the user terminal. For example, each aspect/embodiment of the present disclosure may be applied to a configuration where communication between the base station and the user terminal is replaced with communication between a plurality of user terminals (that may be referred to as, for example, Device-to-Device (D2D) or Vehicle-to-Everything (V2X)). In this case, the user terminal 20 may be configured to include the functions of the above-described base station 10. Furthermore, words such as "uplink" and "downlink" may be read as a word (e.g., a "side") that matches terminal-to-terminal communication. For example, the uplink channel and the downlink channel may be read as side channels.

Similarly, the user terminal in the present disclosure may be read as the base station. In this case, the base station 10 may be configured to include the functions of the above-described user terminal 20.

In the present disclosure, operations performed by the base station are performed by an upper node of this base station depending on cases. Obviously, in a network including one or a plurality of network nodes including the base stations, various operations performed to communicate with a terminal can be performed by base stations, one or more network nodes (that are regarded as, for example, Mobility Management Entities (MMEs) or Serving-Gateways (S-GWs), yet are not limited to these) other than the base stations or a combination of these.

Each aspect/embodiment described in the present disclosure may be used alone, may be used in combination or may be switched and used when carried out. Furthermore, orders of the processing procedures, the sequences and the flow-chart according to each aspect/embodiment described in the present disclosure may be rearranged unless contradictions arise. For example, the method described in the present disclosure presents various step elements by using an exemplary order and is not limited to the presented specific order.

Each aspect/embodiment described in the present disclosure may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New-Radio Access Technology (RAT), New Radio (NR), New radio access (NX), Future generation radio access (FX), the Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideB and (UWB), Bluetooth (registered trademark), systems that use other appropriate radio communication methods, or next-generation systems that are enhanced based on these systems. Furthermore, a plurality of systems may be combined (for example, LTE or LTE-A and 5G may be combined) and applied.

The phrase "based on" used in the present disclosure does not mean "based only on" unless specified otherwise. In other words, the phrase "based on" means both of "based only on" and "based at least on".

Every reference to elements that use names such as "first" and "second" used in the present disclosure does not generally limit the quantity or the order of these elements. These names can be used in the present disclosure as a convenient method for distinguishing between two or more elements. Hence, the reference to the first and second elements does not mean that only two elements can be employed or the first element should precede the second element in some way.

The term "deciding (determining)" used in the present disclosure includes diverse operations in some cases. For example, "deciding (determining)" may be considered to "decide (determine)" judging, calculating, computing, processing, deriving, investigating, looking up, search and inquiry (e.g., looking up in a table, a database or another data structure), and ascertaining Furthermore, "deciding (determining)" may be considered to "decide (determine)" receiving (e.g., receiving information), transmitting (e.g., transmitting information), input, output and accessing (e.g., accessing data in a memory).

Furthermore, "deciding (determining)" may be considered to "decide (determine)" resolving, selecting, choosing, establishing and comparing. That is, "deciding (determining)" may be considered to "decide (determine)" some operation.

Furthermore, "deciding (determining)" may be read as "assuming", "expecting" and "considering".

"Maximum transmit power" disclosed in the present disclosure may mean a maximum value of transmit power, may mean the nominal UE maximum transmit power, or may mean the rated UE maximum transmit power.

The words "connected" and "coupled" used in the present disclosure or every modification of these words can mean every direct or indirect connection or coupling between 2 or more elements, and can include that 1 or more intermediate elements exist between the two elements "connected" or "coupled" with each other. The elements may be coupled or connected physically or logically or by a combination of these physical and logical connections. For example, "connection" may be read as "access". It can be understood in the present disclosure that, when connected, the two elements are "connected" or "coupled" with each other by using 1 or more electric wires, cables or printed electrical connection, and by using electromagnetic energy having wavelengths in radio frequency domains, microwave domains or (both of visible and invisible) light domains in some non-restrictive and non-comprehensive examples.

A sentence that "A and B are different" in the present disclosure may mean that "A and B are different from each other". In this regard, the sentence may mean that "A and B are each different from C". Words such as "separate" and "coupled" may be also interpreted in a similar way to "different".

When the words "include" and "including" and modifications of these words are used in the present disclosure, these words intend to be comprehensive similar to the word "comprising". Furthermore, the word "or" used in the present disclosure intends to not be an exclusive OR.

When, for example, translation adds articles such as a, an and the in English in the present disclosure, the present disclosure may include that nouns coming after these articles are plural.

The invention according to the present disclosure has been described in detail above. However, it is obvious for a person skilled in the art that the invention according to the present disclosure is not limited to the embodiment described in the present disclosure. The invention according to the present disclosure can be carried out as modified and changed aspects without departing from the gist and the scope of the invention defined based on the recitation of the claims. Accordingly, the description of the present disclosure is intended for exemplary explanation, and does not bring any restrictive meaning to the invention according to the present disclosure.

The invention claimed is:

1. A terminal comprising:
   a receiver that receives information related to a plurality of physical downlink shared channels (PDSCHs) that are respectively associated with a plurality of transmission/reception points (TRPs); and
   a processor that, when the plurality of PDSCHs at least partially overlaps in time, assumes that a time offset between the plurality of PDSCHs is equal to or less than a threshold, and performs communication with the plurality of TRPs based on the information.

2. The terminal according to claim 1, wherein the information includes downlink control information (DCI) respectively corresponding to the plurality of TRPs.

3. The terminal according to claim 1, wherein the plurality of PDSCHs partially overlaps in time and does not overlap in frequency.

4. The terminal according to claim 1, wherein the processor reports capability related to the communication with the plurality of TRPs when the plurality of PDSCHs at least partially overlaps in time.

5. A radio communication method for a terminal, comprising:
   receiving information related to a plurality of physical downlink shared channels (PDSCHs) that are respectively associated with a plurality of transmission/reception points (TRPs);
   assuming, when the plurality of PDSCHs at least partially overlaps in time, that a time offset among the plurality of PDSCHs is equal to or less than a threshold; and
   performing communication with the plurality of TRPs based on the information.

6. A base station that communicates with a terminal, comprising:
   a transmitter that transmits, by using at least one transmission/reception point (TRP) of a plurality of TRPs, at least one physical downlink shared channel (PDSCH) that is respectively associated with the at least one TRP, and first information related to the at least one PDSCH; and
   a processor that controls the transmitter so that a time offset between a plurality of PDSCHs to be received by the terminal is equal to or less than a threshold when the plurality of PDSCHs at least partially overlaps in time, the plurality of PDSCHs including the at least one PDSCH.

7. A system comprising a terminal and a base station, wherein
   the terminal comprises:
   a receiver that receives second information related to a plurality of Physical Downlink Shared Channels (PDSCHs) that are respectively associated with a plurality of Transmission/Reception Points (TRPs); and
   a processor that, when the plurality of PDSCHs at least partially overlaps in time, assumes that a time offset between the plurality of PDSCHs is equal to or less than a threshold, and performs communication with the plurality of TRPs based on the second information, and
   the base station comprises a transmitter that, by using at least one TRP of the plurality of TRPs, at least one PDSCH that is respectively associated with the at least one TRP, and first information related to the at least one PDSCH, the first information being included in the second information.

8. The terminal according to claim 2, wherein the plurality of PDSCHs partially overlaps in time and does not overlap in frequency.

9. The terminal according to claim 2, wherein the processor reports capability related to the communication with the plurality of TRPs when the plurality of PDSCHs at least partially overlaps in time.

10. The terminal according to claim 3, wherein the processor reports capability related to the communication with the plurality of TRPs when the plurality of PDSCHs at least partially overlaps in time.

* * * * *